(12) United States Patent
Auer

(10) Patent No.: US 8,574,105 B2
(45) Date of Patent: Nov. 5, 2013

(54) FRONT DERAILLEUR WITH VARIABLE ATTACHMENT TO A BICYCLE FRAME

(75) Inventor: Marcus Auer, Schwebheim (DE)

(73) Assignee: SRAM Deutschland GmbH (DE)

( * ) Notice: Subject to any disclaimer, the term of this patent is extended or adjusted under 35 U.S.C. 154(b) by 1053 days.

(21) Appl. No.: 11/382,767

(22) Filed: May 11, 2006

(65) Prior Publication Data

US 2006/0258494 A1 Nov. 16, 2006

(30) Foreign Application Priority Data

May 14, 2005 (DE) .......................... 10 2005 022 381

(51) Int. Cl.
- *F16H 9/00* (2006.01)
- *F16H 59/00* (2006.01)
- *F16H 61/00* (2006.01)
- *F16H 63/00* (2006.01)

(52) U.S. Cl.
USPC .............................................. 474/82; 474/80

(58) Field of Classification Search
USPC ....................................... 474/80, 82
See application file for complete search history.

(56) References Cited

U.S. PATENT DOCUMENTS

| | | | | |
|---|---|---|---|---|
| 1,884,497 A | * | 10/1932 | Abbott | 248/411 |
| 2,791,462 A | * | 5/1957 | Solway | 294/104 |
| 3,862,487 A | * | 1/1975 | Van Gundy | 29/270 |
| 3,909,505 A | * | 9/1975 | Taylor | 174/72 A |
| 4,046,396 A | * | 9/1977 | Taylor et al. | 280/281.1 |
| 4,079,789 A | * | 3/1978 | Byrd et al. | 172/254 |
| 4,199,997 A | * | 4/1980 | Isobe | 474/82 |
| 4,199,998 A | * | 4/1980 | Isobe | 474/82 |
| 4,305,712 A | * | 12/1981 | Nagano | 474/82 |
| 4,417,744 A | * | 11/1983 | Spear | 280/281.1 |
| 4,616,496 A | * | 10/1986 | Hawkins | 72/53 |
| 5,005,913 A | * | 4/1991 | Kittle et al. | 301/128 |
| 5,259,127 A | * | 11/1993 | Pallatin | 36/118.7 |
| 5,762,560 A | * | 6/1998 | Emmett et al. | 470/20 |
| 5,810,228 A | * | 9/1998 | Brokering | 224/414 |
| 5,846,148 A | * | 12/1998 | Fujii | 474/80 |
| 2003/0000746 A1 | * | 1/2003 | Dixon | 177/144 |
| 2004/0185975 A1 | | 9/2004 | Chen | |
| 2005/0143206 A1 | * | 6/2005 | Tetsuka et al. | 474/80 |
| 2005/0204846 A1 | * | 9/2005 | Valle et al. | 74/469 |

FOREIGN PATENT DOCUMENTS

| | | |
|---|---|---|
| DE | 31 18 035 | 2/1982 |
| DE | 31 18 035 A1 | 2/1982 |
| EP | 0 757 952 | 2/1997 |
| EP | 0 757 952 A1 | 2/1997 |
| EP | 1 452 436 | 9/2004 |
| EP | 14 52 436 A2 | 9/2004 |
| EP | 1 571 076 | 9/2005 |

\* cited by examiner

*Primary Examiner* — William A Rivera
*Assistant Examiner* — Henry Liu
(74) *Attorney, Agent, or Firm* — Milan Milosevic; Lisa Serdynski; Steven Courtright

(57) ABSTRACT

A front derailleur that includes a variable attachment to a mounting socket of a bicycle frame. The front derailleur includes a base member, a chain cage, a parallelogram and an attachment member. The base member includes first and second pivot points and at least two attachment points. The parallelogram includes two parallelogram arms, each having first and second ends. The first ends are pivotable about the first and second pivot points of the base member and the second ends support the chain cage. The attachment member connects the base member to the mounting socket of the bicycle frame through one of the at least two attachment positions. The base member also includes a contact surface for mating with the mounting socket. The different attachment positions allow the position of the front derailleur to be adapted to a standard or compact set of chainrings.

7 Claims, 3 Drawing Sheets

FRONT DERAILLEUR WITH VARIABLE ATTACHMENT TO A BICYCLE FRAME

BACKGROUND OF THE INVENTION

The present invention relates to the variable attachment of a front derailleur to a braze-on mounting socket of a bicycle frame.

A typical braze-on mounting socket is located on the seat tube of the bicycle frame oriented towards the axis of the crank assembly and located at a defined distance from the axis of the crank assembly. This defined distance is determined by the type of chainrings being used, e.g. a standard set of chainrings with 53/52 or 53/30 teeth, or a compact set of chainrings having 50/36 and 48/34 teeth. A drawback associated with the braze-on mounting socket is that it does not accommodate for the radial difference between different sets of chainrings requiring the use of two different front derailleurs to compensate for the radial difference.

EP 0 757 952 A1 discloses a front derailleur including an attachment device for fastening the derailleur to the crank assembly which accommodates different sized sets of chainrings. The attachment device includes a frame, a chain cage, and two adjusting bushings, each having one eccentrically oriented opening, which may be mounted in two positions thus allowing for different radial distances between the front derailleur and the axis of the crank assembly. The adjustment range that results from the variable installation of the adjusting bushings, corresponds to the radial difference between the large chainrings of the different sets of chainrings. This attachment device allows the front derailleur to be mounted to the crank independently of the position of the braze-on mounting socket. However, in comparison to a conventional attachment to a braze-on mounting socket, this configuration requires a complex frame support and two adjusting bushings. This negatively affects the installation time and production costs.

SUMMARY OF THE INVENTION

The present invention provides a front derailleur of simple construction that allows variable attachment positions of the front derailleur to a frame mounting socket at variable attachment positions or distances from the axis of the crank to accommodate different sets of chainrings. The front derailleur generally includes a base member, a parallelogram, a derailleur element or chain cage, and a reset spring. The base member includes first and second pivot points and at least two attachment positions. The parallelogram includes two parallelogram arms, each having first and second ends. The first ends are pivotable about the first and second pivot points. The second ends support the chain cage. The front derailleur further includes an attachment member for connecting the base member to the mounting socket, typically a braze-on mounting socket, of the bicycle frame through one of the attachment positions. The base member also includes a contact surface for mating with the braze-on mounting socket.

In one embodiment of the present invention, the attachment positions are threaded bores and the attachment member is a fastening screw. The threaded bores are parallel to one another and the distance between the threaded bores corresponds to the difference between the radii of the largest chainrings of the different sets of chainrings. The threaded bores are disposed above the lower of the first and second pivot points and the centerlines of the bores are aligned with a centerline of the lower pivot point. The threaded bores allow the position of the front derailleur to be adapted to the corresponding set of chainrings being used, e.g. a standard set of chainrings or a compact set of chainrings.

In another embodiment of the present invention, the threaded bores may be replaced with through bores and seats for receiving a threaded insert such as a nut. This configuration is used when the material of the base member is not suitable for threads capable of carrying such loads.

In another embodiment of the present invention, the threaded bores may be replaced with a threaded insert that may be mounted in at least two different positions on the base member. The threaded insert includes an asymmetrically positioned threaded bore for receiving the attachment member. The base member includes a fastening slot for receiving the threaded insert and an elongated opening for receiving the attachment member at variable attachment positions. The location of the threaded bore on the threaded insert and the length and orientation of the threaded insert in the fastening slot permit a second attachment position to accommodate a different set of chainrings.

When attaching the front derailleur to the braze-on mounting socket, the fastening screw is inserted through an opening on the braze-on mounting socket, through the elongated hole in the base member, and screwed into the threaded insert that is properly positioned in the fastening slot. Thus, the base member is detachably attached to the braze-on mounting socket. The length of the elongated hole in the base member corresponds to at least the difference between the radii of the large chainrings of the various sets of chainrings plus the thread diameter of the fastening screw. The range for positioning the front derailleur may be further extended by a corresponding lengthening of the elongated hole and the fastening slot, thereby providing more than two attachment positions for the front derailleur.

This attachment of the front derailleur with at least two alternative attachment positions on the base member of the front derailleur, allows for a simple and stable positioning of the front derailleur on the braze-on mounting socket for the corresponding set of chainrings. No further support or adaptors—that would increase the installation time and production costs—are necessary. Further, a stable attachment of the front derailleur is achieved by matching the contours of the contact surfaces on the base member and braze-on mounting socket.

These and other features and advantages of the invention will be more fully understood from the following description of certain embodiments of the invention, taken together with the accompanying drawings.

DETAILED DESCRIPTION

Figure 1:
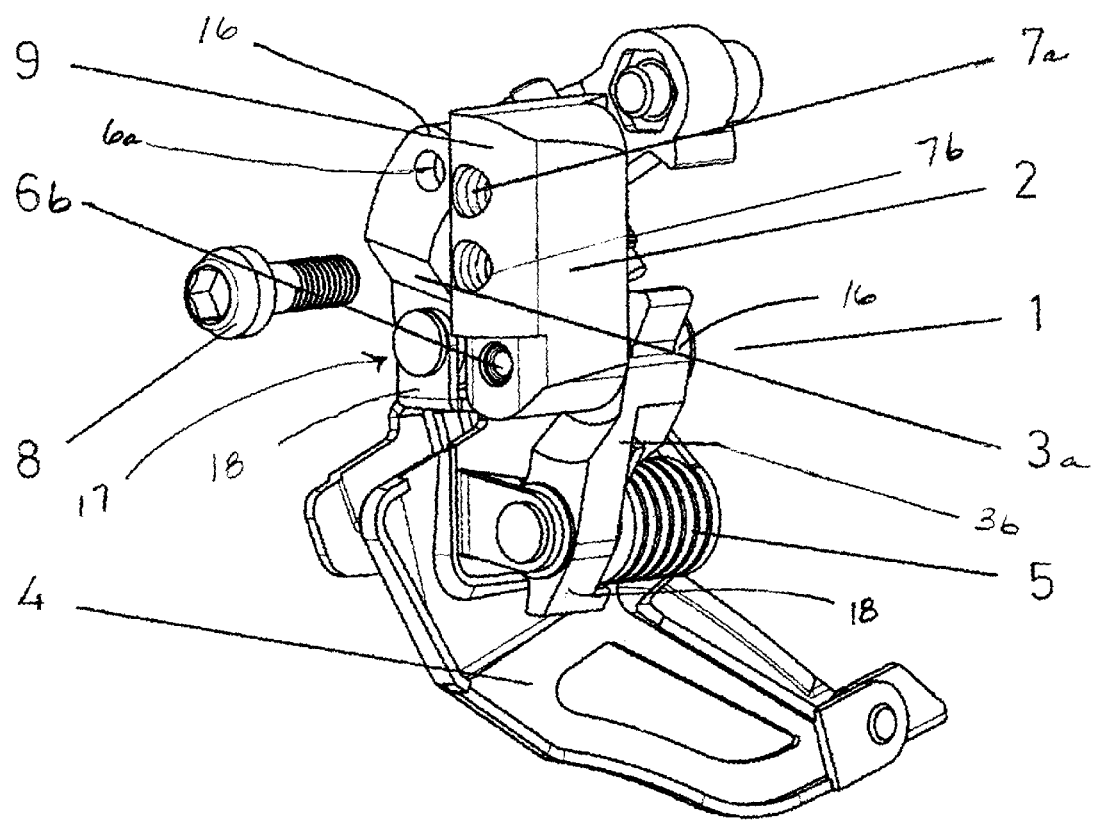
FIG. 1 is a perspective view of a front derailleur having a variable attachment in accordance with one embodiment of the present invention.

FIG. 1 shows a front derailleur 1 according to one embodiment of the present invention. The front derailleur 1 generally includes a base member 2, a parallelogram 17 having two arms 3a, 3b, a derailleur element or chain cage 4, and a reset spring 5. The base member 2 includes first and second pivot points 6a and 6b and attachment positions, in this embodiment threaded bores 7a, 7b, for selectively receiving an attachment member 8 such as a fastening screw. Each of the parallelogram arms 3a, 3b have first and second ends 16, 18. The first ends 16 are pivotable about the first and second pivot points 6a, 6b and the second ends 18 support the chain cage. The threaded bores 7a, 7b are substantially parallel to one another. The front derailleur 1 may be mounted to a seat tube of the bicycle frame or a braze-on mounting socket 20 (see FIG. 3). The base member 2 includes a contact surface 9 corresponding to a mating surface 22 of the braze-on mounting socket. In this embodiment, the contact surface 9 has a convex contour.

To mount the front derailleur 1 to the braze-on mounting socket 20, the contact surface 9 is placed on the opposing surface 22 of the braze-on mounting socket 20 and then the attachment member 8 is screwed into one of the attachment positions 7a, 7b. If a standard set of chainrings is being used, then the attachment member 8 is screwed into the lower threaded bore 7b. If a compact set of chainrings is being used, then the attachment member 8 is screwed into the higher threaded bore 7a. The convex contour of the contact surface 9 of the base member 2 stabilizes the attachment and properly orients the front derailleur 1 on the braze-on mounting socket 20. Further, by screwing the attachment member 8 into the threaded bore 7, the contact surface 9 of the base member 2 forms a detachable, positive connection with the mating surface 22 of the braze-on mounting socket 20.

Figure 2:
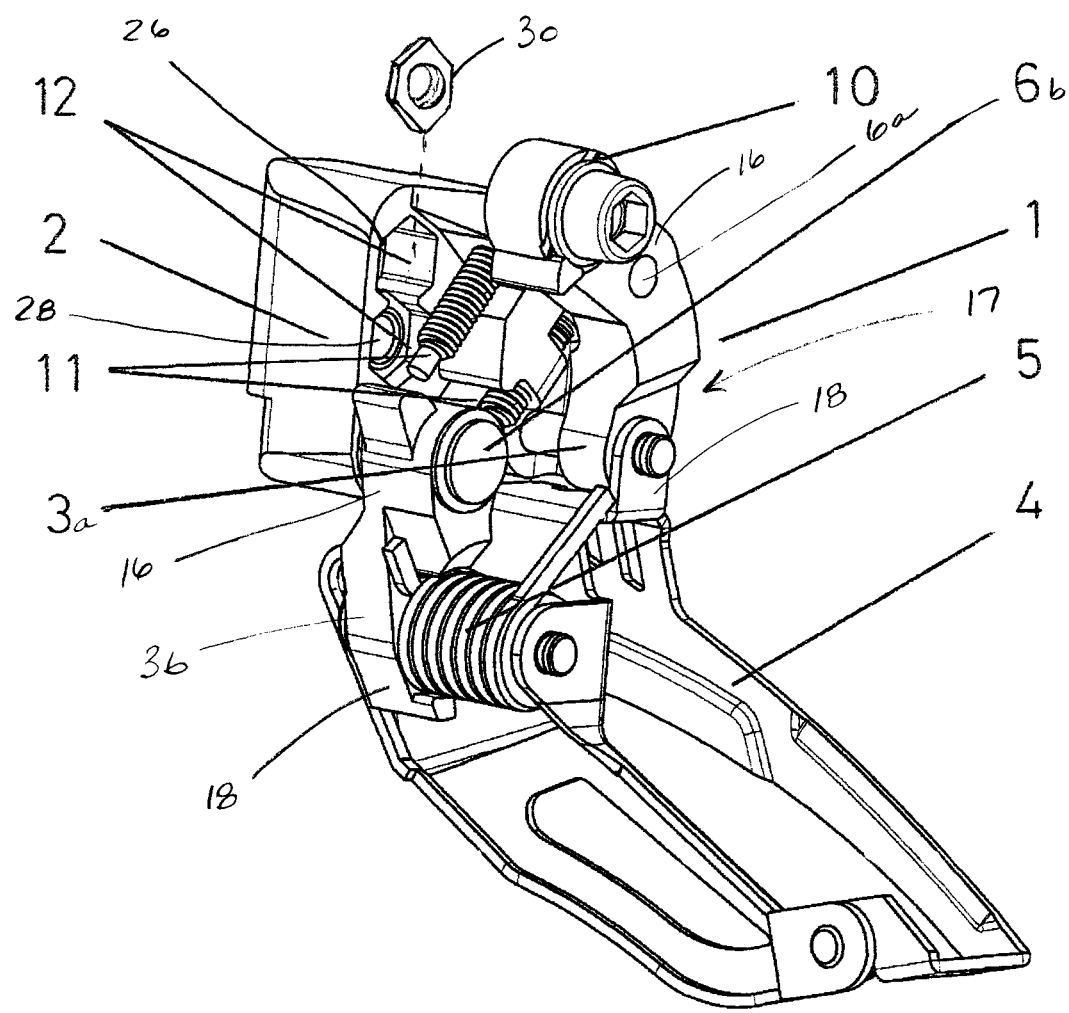
FIG. 2 is a perspective view of a front derailleur having a variable attachment in accordance with one embodiment of the present invention.

Looking to FIG. 2, in another embodiment of the present invention, the two parallelogram arms 3a, 3b are connected to the base member 2 through the pivot points 6a, 6b. The parallelogram arm 3a includes a cable clamp 10 on one end. The reset spring 5 biases the chain cage 4 toward the base member 2. The maximum shifting travel is limited by the adjusting screws 11. In this embodiment of the present invention, the two threaded bores 7a, 7b of FIG. 1 are replaced with two through holes 26, 28 and seats or openings 12 for receiving a threaded insert 30. The attachment member 8 or fastening screw (not shown) is inserted into the upper 26 or lower 28 through bore depending on the size of chainrings being used, and then screwed into the threaded insert 30, in this embodiment, a hexagonal nut disposed in the seat or opening 12.

Figure 3:
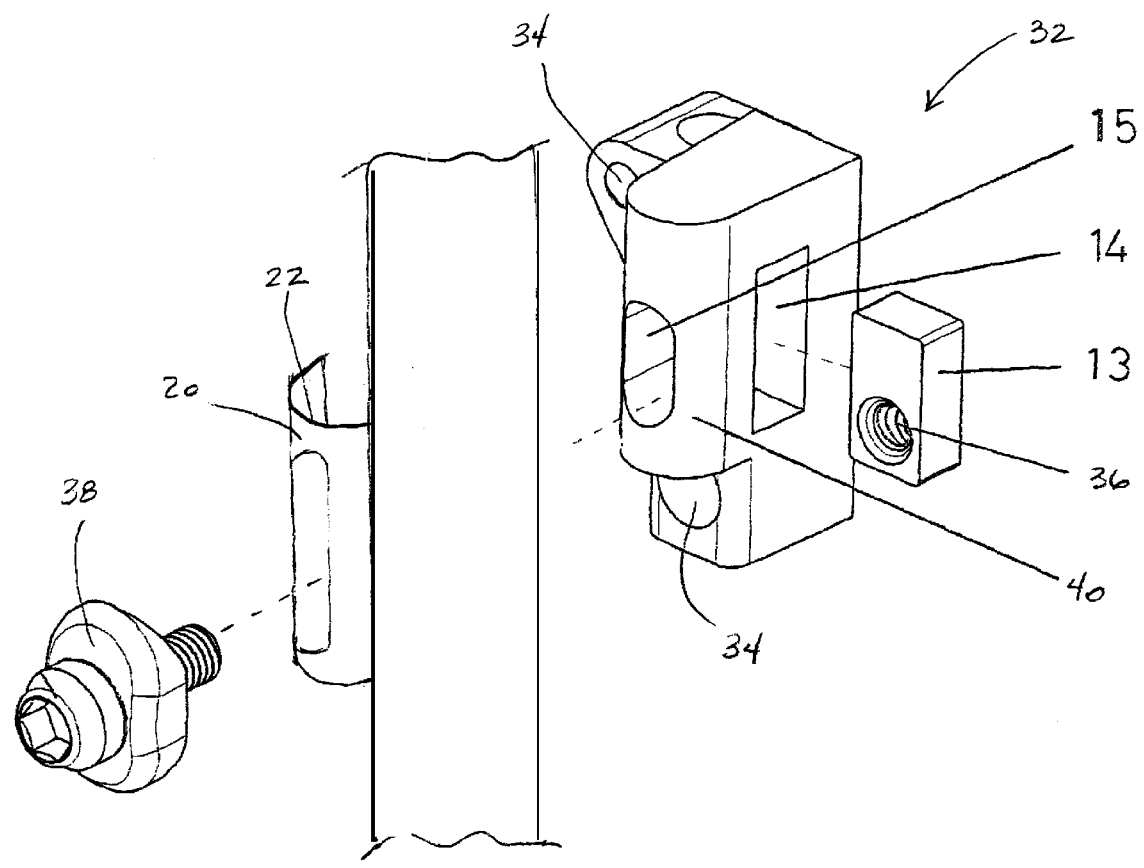
FIG. 3 is a perspective view of a base member of a front derailleur in accordance with one embodiment of the present invention.

FIG. 3 illustrates a base member 32 for attaching the front derailleur 1 to the bicycle frame according to another embodiment of the present invention. The base member 32 includes two bores 34 that form the pivot points 6a, 6b for the parallelogram arms 3a, 3b. The base member 32 further includes a fastening slot 14 and an elongated hole 15. The fastening slot 14 is configured to receive a threaded insert 13. The threaded insert 13 includes an asymmetrically-positioned threaded bore 36. The threaded insert 13 is configured to be placed in the fastening slot 14 with the threaded bore 36 facing the elongated hole 15 such that the attachment member 38 may extend through the elongated hole 15 into the threaded bore 36 to provide a first attachment position. A second attachment position may be provided by flipping the threaded insert 13 in the fastening slot 14. The first and second attachment positions correspond to different sets of chainrings. The length of the elongated hole 15 corresponds at least to the difference between the radii of the large chain rings of the various sets of chainrings, plus the diameter of the fastening screw. The displacement range for positioning the front derailleur may be extended by a corresponding lengthening of the elongated hole 15 and the fastening slot 14, allowing for more than two front derailleur attachment positions.

While this invention has been described by reference to several embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A front derailleur attachable to a bicycle frame comprising:
    a base member having first and second pivot points and two alternative attachment bores with centerlines;
    a chain cage;
    a parallelogram including two parallelogram arms, each having first and second ends, the first ends pivotable about the first and second pivot points of the base member, the second ends supporting the chain cage; and
    an attachment member for alternatively connecting the base member to a mounting socket of the bicycle frame through one of the two alternative attachment bores of the base member, the base member having a contact surface for mating with the mounting socket, the centerlines of the two alternative attachment bores substantially aligned with a centerline of the lower of the first and second pivot points.

2. The front derailleur according to claim 1, wherein the contact surface of the base member has a convex contour configured to mate with an opposing surface of the mounting socket for aligning the front derailleur.

3. The front derailleur according to claim 1, wherein the attachment member is a fastening screw.

4. The front derailleur according to claim 1, wherein the two alternative attachment bores are through bores having seats for receiving threaded inserts.

5. The front derailleur according to claim 1, wherein the two alternative attachment bores are disposed above the lower of the first and second pivot points.

6. A front derailleur attachable to a bicycle frame comprising:
    a base member having first and second pivot points, an elongated opening and a fastening slot for receiving a threaded insert having an asymmetrically positioned threaded bore therein, the threaded insert having alternative mounting positions within the fastening slot corresponding to first and second attachment positions of the threaded bore, the first and second attachment positions having centerlines;
    a chain cage;
    a parallelogram including two parallelogram arms, each having first and second ends, the first ends pivotable about the first and second pivot points of the base member, the second ends supporting the chain cage; and
    an attachment member for alternatively connecting the base member to a mounting socket of the bicycle frame through the elongated opening to one of the first and second attachment positions of the threaded bore, the base member having a contact surface for mating with the mounting socket, the centerlines of the first and second attachment positions of the threaded bore and substantially aligned with a centerline of the lower of the first and second pivot points.

7. The front derailleur attachable to a bicycle frame of claim 6, wherein the threaded insert is reversed within the fastening slot to produce the alternative mounting positions.

* * * * *